United States Patent Office 3,016,941
Patented Jan. 16, 1962

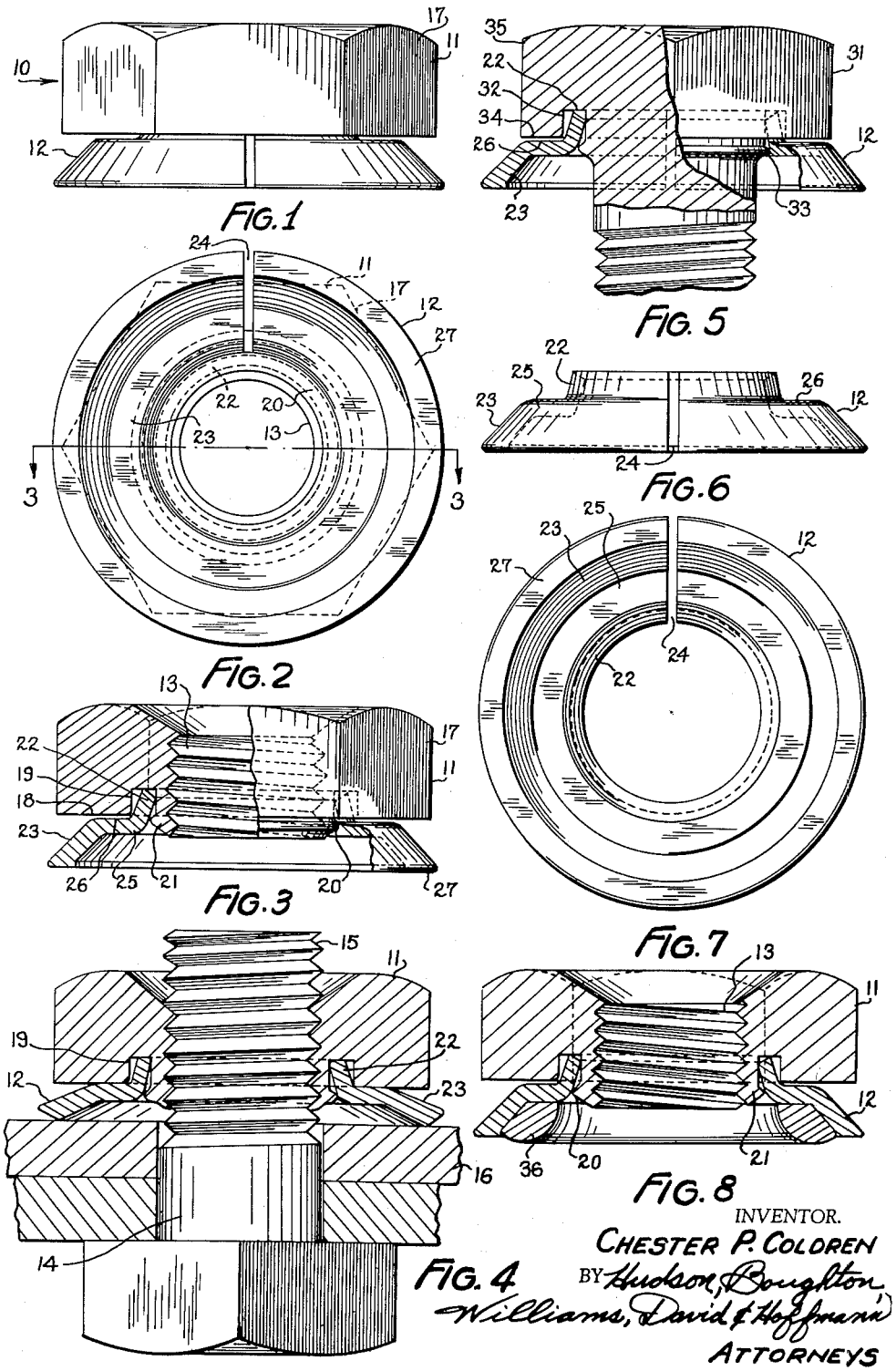

3,016,941
FASTENING DEVICES
Chester P. Coldren, Canton, Ohio, assignor to Eaton Manufacturing Company, Cleveland, Ohio, a corporation of Ohio
Filed Sept. 18, 1958, Ser. No. 761,766
1 Claim. (Cl. 151—38)

This invention relates to fastening devices of the kind comprising an assembly of a threaded nut or bolt with a washer of the locking or tensioning type and, as one of its objects, provides an improved construction for a fastening device of this character.

It is also an object of this invention to provide a novel form of such an assembly type of fastening device in which the washer cooperates with the threaded member in a unique manner to apply tension, or reactive force, to the fastening produced and wherein the reactive force developed is of a value or range in excess of those heretofore attainable.

As another of its objects this invention provides a fastening device employing a washer having a collar or flange which cooperates in a novel manner with an annular groove of the associated bolt head or nut for connecting the washer therewith and whereby a reactive moment is produced for achieving a highly effective holding or locking action.

Still another object of the invention is to provide a unitary fastening device or assembly comprising a threaded member and a washer having a resiliently deformable cupped flange or skirt portion which is preferably split at one point thereof but is otherwise annularly continuous, the skirt portion being engageable with and deformable against an adjacent work surface under the tightening influence of the threaded member.

A further object of the invention is the provision of a fastening device of the character above indicated and which includes a sealing element adapted to seal the fastening upon a tighting thereof, the sealing element being carried by the reaction- or tension-producing washer and located in the recess thereof.

The manner in which these and other objects are attained will be apparent from the following detailed description and the accompanying sheet of drawings forming a part of this specification and in which:

FIG. 1 is a side elevation of a fastening device of this invention and showing the same as embodying a hexagonal nut;

FIG. 2 is a bottom plan view of the device of FIG. 1;

FIG. 3 is a view similar to FIG. 1 but taken partly in section along line 3—3 of FIG. 2;

FIG. 4 is a sectional view of the device of FIG. 1 showing the same applied to a workpiece and held thereagainst by a bolt to form a completed fastening;

FIG. 5 is a side view, partly in section, showing the invention applied to the head of a bolt or screw;

FIG. 6 is a side elevation of the deformable washer in detached relation;

FIG. 7 is a bottom plan view of the washer of FIG. 6, and

FIG. 8 is a sectional view of an embodiment of the invention which includes a sealing element.

One embodiment of the fastening device or assembly, indicated generally as 10, is seen in FIGS. 1 to 4 to comprise a threaded member in the form of a hexagonal nut 11 and a washer or reaction member 12. The nut 11 has threads 13 by which it may be threaded onto a bolt or screw 14 having complementary threads 15.

In use the nut 11 will be advanced along bolt 14 until the reaction washer or member 12 engages, and is deformed or flattened against, a workpiece 16 in a manner which will be described hereafter. The resilient qualities of washer 12 maintain the assembly 10 in a tensioned or locked condition against the workpiece 16.

The nut 11 has the general appearance of conventional nuts in that it has threads 13 providing an axially extending threaded portion or tapped opening and flats 17 or other suitable configuration for receiving a wrench or other torque applying tool. The nut 11 also has an axially facing annular clamping portion or pressure applying face or surface 18 surrounding the axis of the threaded portion. The face 18 is here shown as being flat and extends generally transversely of the nut with respect to the axis and threaded portion thereof. For convenience, although the fastening device has no preferred position or attitude in use, the surface 18 may be considered to be on the under or downward side.

Found also on the under side of nut 11 is an axially extending annular groove 19. Groove 19 is defined on its outer side by the inner edge of the pressure applying face 18 and is defined on its inner side by an upset portion or bead 20 formed on a central boss 21 of the nut 11.

The washer or reaction member 12 is in a preassembled association with the nut 11 to form the fastening assembly 10. An upwardly extending, somewhat frusto-conically shaped collar or inner flange 22 is formed on washer 12 and is received in the groove 19 of nut 11. This collar or flange 22 is circular and is so proportioned that it is able to rotate in the groove with respect to the nut 11 but is restrained from moving transversely thereto. The bead 20 on boss 21 extends part-way across the mouth opening of the groove 19 and thus serves to retain the flange 22 in the groove 19 thereby maintaining the nut 11 and washer 12 in an assembled condition.

A downward and flaring skirt or outer flange 23 forms a part of washer 12. Flange 23 is cup-shaped and is adapted to engage the workpiece 16 and to be deformed or flattened thereagainst under the tightening influence of the nut 11. As can be seen in FIGS. 1 and 2 the washer 12 is split as at 24 but is otherwise annularly continuous. The washer is of resilient material and the split 24 aids in preventing a set from occurring when the washer is in its distorted or deformed state against a workpiece 16.

The inner flange 22 and outer flange 23 of the washer 12 are connected by an annular portion or web 25. Web 25 presents a pressure reaction face or transverse surface 26 adjacent, and adapted to abut, surface 18 of nut 11.

In applying the fastening, the assembly 10 is turned down the cooperating threads 15 of a bolt or screw 14 until the edge 27 of cupped flange 23 engages the workpiece 16. Further tightening brings the clamping or pressure applying surface 18 closer to the workpiece 16. Inasmuch as the flange 22 is constrained against transverse or inward movement by the wall of groove 19 defined by the boss 21, force exerted by the clamping surface 18 against the surface 26 of the washer will develop a moment in the washer which is resisted by workpiece 16 acting on flange 23. Upon continued tightening, the outer cup-shaped flange 23 is resiliently flattened or deformed with respect to the collar or inner flange 22 and the face 26 of the web 25.

The particular manner in which the washer 12 is deformed provides the fastening device of this invention with an extended reaction range. That is to say, throughout the deforming of washer 12 by bringing surface 18 closer to workpiece 16, a reaction force is exerted by surface 26 of the washer against the clamping surface 18 of the nut or threaded member, thereby maintaining the assembly under tension.

Turning to the form of the device seen in FIG. 5, and in which like parts are designated by corresponding numerals, it will be noted that a bolt or screw 31, having a head 35, is used as the threaded member.

The collar or inner flange 22 of the washer 12 is retained in a groove 32 in the screw head 35 by a bead 33. The annular reaction face 26 of the washer is adjacent a clamping or pressure exerting surface 34 on the under side of the head 35, which surface is analogous to the clamping surface 18 of the nut 11. The operation and manner of use of this embodiment will be apparent from the foregoing description of the operation of the fastener of FIG. 1.

As a further feature there may be included a sealing element 36 as shown in FIG. 8. The sealing element may be in the form of a compound or pliable material suitable for the particular job the fastening device is to perform. The sealing material or element 36 is carried in the cup-shaped flange 22 of the washer 12 and is adapted to be compressed or squeezed between the washer and the workpiece 16 when the washer is deformed in use into its tension exerting condition.

From the foregoing description and drawings it will now be seen that this invention provides an improved construction for fastening devices involving a threaded member and a tensioning washer such that the previously recited objects and advantages, as well as others, are readily attained.

Although fastening devices constructed according to this invention have been described herein to a somewhat detailed extent, it should be understood, of course, that the invention is not to be correspondingly limited in scope but includes all changes and modifications coming within the scope of the claim.

Having described my invention, I claim:

In a fastener assembly; a threaded member comprising a body having an axially extending portion carrying a screw thread; a flat annular clamping surface on said body and lying in a plane extending transverse to the axis of the thread-carrying portion; said body having an annular groove therein between said thread-carrying portion and said clamping surface including an axially facing annular mouth opening lying in said plane; said groove having radially spaced outer and inner axially straight cylindrical side walls disposed in a parallel relation to each other and to said axis and with said inner side wall located on and extending around said said thread-carrying portion; a washer connected with said body for rotation relative thereto and comprising an inner annular flange and a flexible outer annular flange connected with the inner flange by a radially disposed intermediate annular web containing an opening; said inner flange projecting axially from said web on one side thereof and received in said groove, and said outer flange projecting axially from said web on the other side thereof for engagement with an associated work surface; said washer being split thereacross at one side of said opening; said outer flange being of a frusto-conical shape and inclined axially and outwardly from said web; said web being subject to axial thrust engagement by said clamping surface for pressing and deflecting said outer flange against said work surface; said inner flange being of a circular frusto-conical shape and inclined axially and inwardly toward said axis so as to have a minimum-diameter circular free end portion closely embracing said axially straight cylindrical inner side wall; and a radial annular bead projection on said thread-carrying portion and extending part-way across said mouth opening for retaining said washer connected with said body; the maximum diameter of said bead projection being greater than the minimum diameter of said circular free end portion for preventing withdrawal of said inner flange from said groove.

References Cited in the file of this patent

UNITED STATES PATENTS

| | | |
|---|---|---|
| 97,752 | Billings | Dec. 14, 1869 |
| 1,320,259 | Martens | Oct. 28, 1919 |
| 2,619,145 | Poupitch | Nov. 25, 1952 |
| 2,619,146 | Poupitch | Nov. 25, 1952 |
| 2,681,678 | Hage | June 22, 1954 |
| 2,766,799 | Poupitch | Oct. 16, 1956 |